United States Patent
Lee et al.

(10) Patent No.: US 9,950,633 B2
(45) Date of Patent: Apr. 24, 2018

(54) SYSTEM FOR CHARGING ELECTRIC VEHICLE IN WHICH ELECTRIC VEHICLE IS DISTINGUISHED FROM OTHER ELECTRIC DEVICES

(71) Applicant: Hyundai Motor Company, Seoul (KR)

(72) Inventors: Yeong Ju Lee, Jeollabuk-do (KR); Chul Soo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 261 days.

(21) Appl. No.: 14/861,032

(22) Filed: Sep. 22, 2015

(65) Prior Publication Data

US 2016/0121743 A1    May 5, 2016

(30) Foreign Application Priority Data

Nov. 4, 2014    (KR) .......................... 10-2014-0152312

(51) Int. Cl.
*H02J 7/00* (2006.01)
*B60L 11/18* (2006.01)
(Continued)

(52) U.S. Cl.
CPC ....... *B60L 11/1818* (2013.01); *B60L 11/1816* (2013.01); *B60L 11/1824* (2013.01); *B60L 11/1838* (2013.01); *B60L 11/1848* (2013.01); *G07F 15/005* (2013.01); *H01R 27/02* (2013.01); *H02J 7/00* (2013.01); *B60L 2230/00* (2013.01); *B60L 2230/12* (2013.01); *B60L 2230/40* (2013.01); *B60L 2240/70* (2013.01); *B60L 2250/20* (2013.01); *H02J 7/0021* (2013.01); *H02J 7/0027* (2013.01); *H02J 7/0042* (2013.01);
(Continued)

(58) Field of Classification Search
CPC .............. B60L 11/1816; B60L 11/1818; B60L 11/1824; B60L 11/1838; B60L 11/1848; B60L 2230/00; B60L 2230/12; B60L 2230/40; B60L 2240/70; B60L 2250/20; H02J 7/00; H02J 7/0021; H02J 7/0027; H02J 7/0042
USPC ......................................... 320/109
See application file for complete search history.

(56) References Cited

U.S. PATENT DOCUMENTS

2010/0145540 A1    6/2010    McKenna
2010/0306033 A1*   12/2010   Oved ............... G06Q 10/06375
                                                     705/7.37
(Continued)

FOREIGN PATENT DOCUMENTS

JP    2013-081361 A    5/2013
JP    2013-102679 A    5/2013
(Continued)

*Primary Examiner* — Nathaniel Pelton
(74) *Attorney, Agent, or Firm* — Mintz Levin Cohn Ferris Glovsky and Popeo, P.C.; Peter F. Corless

(57) ABSTRACT

A system for charging an electric vehicle uses an in-cable control box (ICCB), and includes: an electrical connecting device for slow charging which supplies a vehicle with electricity, which is supplied through an RFID power socket when the electrical connecting device is connected to the RFID power socket, so as to charge the vehicle, in which the electrical connecting device collects information about electric energy used to charge the vehicle and information about a position where the vehicle is charged, in order to charge for electricity according to an electricity rate applicable to the vehicle.

9 Claims, 1 Drawing Sheet

(51) Int. Cl.
*H01R 27/02* (2006.01)
*G07F 15/00* (2006.01)

(52) U.S. Cl.
CPC ........ *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2012/0026726 A1* | 2/2012 | Recker | ............... | F21K 9/13 362/157 |
| 2012/0109402 A1* | 5/2012 | Shelton | ............... | B60L 3/0069 700/297 |
| 2014/0191718 A1* | 7/2014 | Reineccius | ......... | B60L 11/1818 320/108 |

FOREIGN PATENT DOCUMENTS

| | | |
|---|---|---|
| KR | 2010-0062802 A | 6/2010 |
| KR | 2012-0075508 A | 7/2012 |
| KR | 10-1448612 B1 | 10/2014 |
| WO | 2010/051477 A2 | 5/2010 |
| WO | 2012/058421 A2 | 5/2012 |
| WO | 2013/132449 A1 | 9/2013 |

\* cited by examiner

SYSTEM FOR CHARGING ELECTRIC VEHICLE IN WHICH ELECTRIC VEHICLE IS DISTINGUISHED FROM OTHER ELECTRIC DEVICES

CROSS-REFERENCE TO RELATED APPLICATION

This application claims under 35 U.S.C. § 119(a) the benefit of Korean Patent Application No. 10-2014-0152312 filed on Nov. 4, 2014, the entire contents of which are incorporated herein by reference.

BACKGROUND (a) Technical Field

The present invention relates to a system for charging an electric vehicle using an in-cable control box (ICCB).

(b) Description of the Related Art

Recently, a system for slowly charging an electric vehicle has been used, in particular, electric vehicle station equipment (EVSE), and an electric charging system using an in-cable control box (ICCB).

An electric charging system using the EVSE is used by installing the EVSE, which is connected to an electricity distribution board, at a necessary position for performing work for supplying electric power. According to the electric charging system using the EVSE, the time required to charge the electric vehicle is comparatively short, and the time required to charge the electric vehicle may be reduced because of a capacity of the EVSE. In particular, an electricity rate applied for charging the electric vehicle, which is set by an electric power company, is the same for all users, such that a progressive tax is not imposed, and thus the electricity rate is low.

Referring to FIG. 2 (PRIOR ART), the electric charging system using the ICCB is used to charge the electric vehicle by connecting the ICCB 2 to a general power socket 1, which is used in the related art, and has an advantage in that the electric vehicle may be charged at any place where the power socket is installed, and separate installation costs are not required.

However, in the case of the electric charging system using the EVSE, there are problems in that high installation costs are incurred due to costs required to purchase the EVSE and costs required for work for supplying electric power, and there is a limitation on the type of place for charging the electric vehicle.

There are problems in that in the case of the electric charging system using the ICCB, because the electric vehicle is charged using a general domestic power socket, it is impossible to distinguish whether to charge the electric vehicle or a general electric device, and therefore, as electric consumption increases, a progressive tax is imposed, such that excessive costs are required for maintenance of the vehicle, and time required to charge the electric vehicle is increased in accordance with the rating of the power socket connected with the ICCB.

The above information disclosed in this Background section is only for enhancement of understanding of the background of the invention and therefore it may contain information that does not form the prior art that is already known in this country to a person of ordinary skill in the art.

SUMMARY

The present invention provides a system for charging an electric vehicle, which may distinguish an operation of charging the electric vehicle, which uses an in-cable control box (ICCB), from an operation of charging a general electric device, so as to prevent progressive taxes from being incurred by charging the electric vehicle, and to enlarge an infrastructure for charging the vehicle.

In one aspect, the present invention provides a system for charging an electric vehicle, including: an electrical connecting device which supplies a vehicle with electricity, which is supplied through an RFID power socket when the electrical connecting device is connected to the RFID power socket, so as to charge the vehicle, in which the electrical connecting device collects information about electric energy used to charge the vehicle and information about a position where the vehicle is charged, in order to charge for electricity according to an electricity rate dedicated for the vehicle.

In a preferred embodiment, the system may include an electric power company which charges for electricity used to charge the vehicle, based on the information about a position where the vehicle is charged and the information about electric energy which are transmitted from the electrical connecting device, and by means of a server for a charging service provider, the electrical connecting device may transmit the information about a position where the vehicle is charged and the information about electric energy to the electric power company which charges for electricity used to charge the vehicle.

In another preferred embodiment, the electrical connecting device may include: a charging connector unit which is connected with the vehicle; a socket connecting unit which is electrically connected with the RFID power socket, and supplied with electricity supplied through the RFID power socket; and a control unit which collects the information about electric energy used to charge the vehicle and the information about a position where the vehicle is charged, and transmits the information to a server for a charging service provider.

In still another preferred embodiment, the control unit may include: an electric meter which measures accumulated electric energy used to charge the vehicle for a certain period of time; a first data communication unit which collects predetermined vehicle information including a vehicle position while being operated in conjunction with a data communication unit for a vehicle which is mounted in the vehicle; and a second data communication unit which transmits the vehicle information collected by the first data communication unit and the information about electric energy measured by the electric meter to the server for a charging service provider.

In yet another preferred embodiment, an RFID card, which is used to verify an operation of charging the vehicle when the electrical connecting device is connected to the RFID power socket, may be installed in the electrical connecting device, and an RFID recognition device, which is used to distinguish whether or not connection is made to charge the vehicle by reading the RFID card when the electrical connecting device is connected to the RFID power socket, may be installed in the RFID power socket.

According to the system for charging an electric vehicle according to the present invention, electricity rates dedicated for the electric vehicle may be applied to a general house or building, and it is possible to prevent progressive taxes from being incurred when the vehicle is charged. In addition, it is not necessary to separately perform work for supplying electric power, and it is possible to reduce installation costs and costs required to purchase devices because the existing general power socket is utilized.

Other aspects and preferred embodiments of the invention are discussed infra.

Further, a system for charging an electric vehicle can include: an electrical connecting device which supplies a vehicle with electricity, which is supplied through an RFID power socket when the electrical connecting device is connected to the RFID power socket, so as to charge the vehicle, the electrical connecting device configured to collect information about electric energy used to charge the vehicle and information about a position where the vehicle is charged, in order to charge for electricity according to an electricity rate dedicated for the vehicle; and the electrical connecting device configured to communicate with a server of a charging service provider, the electrical connecting device transmitting the information about the position where the vehicle is charged and the information about the electric energy to an electric power company which charges for electricity used to charge the vehicle.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
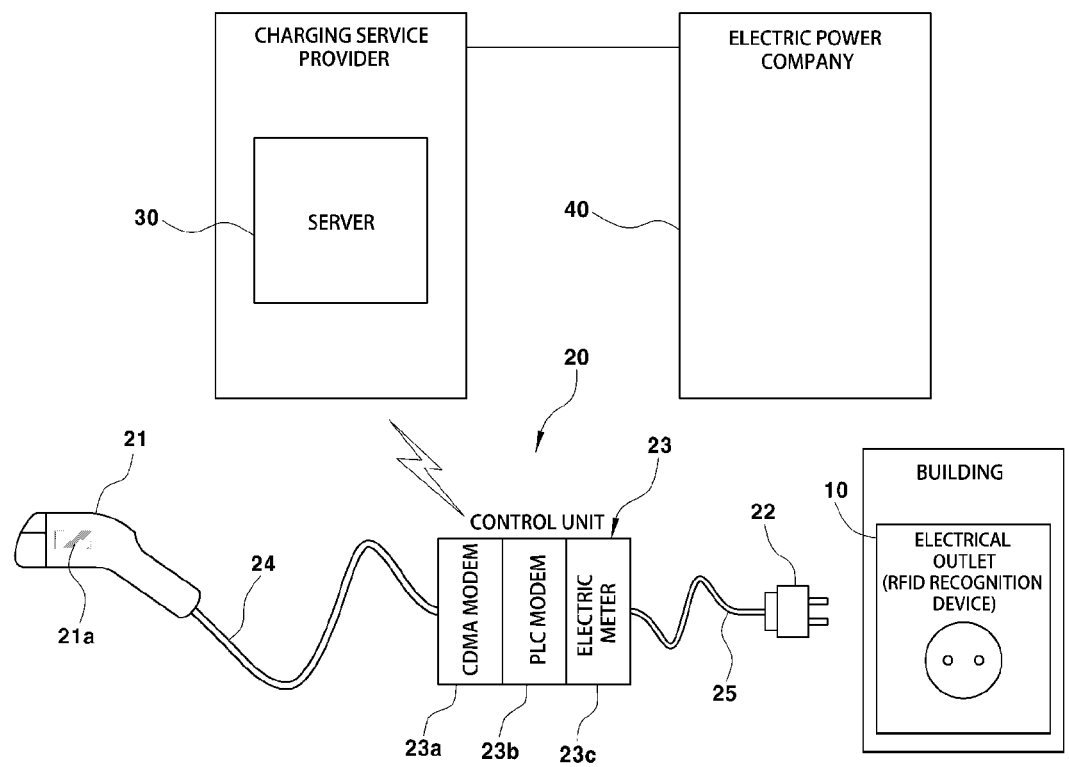
FIG. 1 is a schematic view of a system for charging an electric vehicle according to an exemplary embodiment of the present invention.
Figure 2:
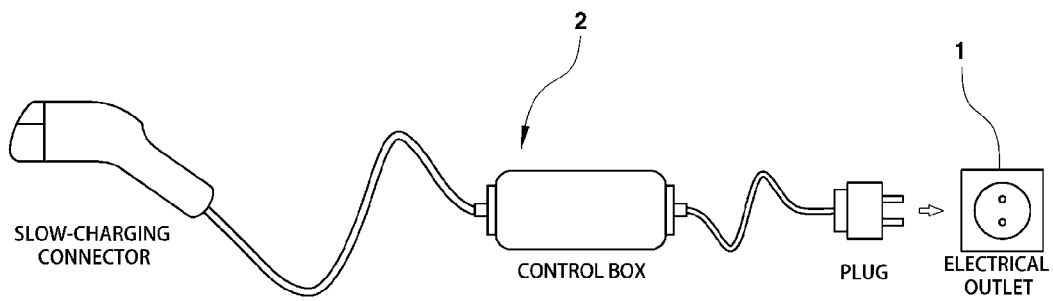
FIG. 2 (PRIOR ART) is a schematic view illustrating a system for charging an electric vehicle in the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described so that those skilled in the technical field to which the present invention pertains may easily carry out the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

As illustrated in FIG. 1, a system for charging an electric vehicle according to the present invention includes an RFID (radio frequency identification) power socket 10, an electrical connecting device 20 for slow charging, a server 30 for a charging service provider, and an electric power company 40.

The RFID power socket 10 is a device connected with a connecting mechanism such as a socket connecting unit 22 that will be described below, and serves to connect a connecting mechanism (socket connecting unit), which is connected to the power socket 10, to the electric power company 40 so that electric power supplied from the electric power company 40 may be supplied to the connecting mechanism. For example, the electric power company 40 may be located remotely, and supplies the electric power via a connection to a building containing one or more outlets (e.g., the power socket 10).

In addition, the RFID power socket 10 is made by installing an RFID recognition device to a general power socket that is installed in the existing house or building, and distinguishes, using the RFID recognition device, whether an object connected to the power socket 10 is an electric vehicle or a general electric device, and unique position identification (ID) is assigned to the RFID power socket.

The electrical connecting device 20 for slow charging is a portable electrical connecting device such as an in-cable control box (ICCB), and includes a charging connector unit 21, the socket connecting unit 22, and a control unit 23. An RFID (radio frequency identification) card 21a is embedded in the charging connector unit 21, such that the RFID recognition device of the power socket 10 reads the RFID card 21a when the electrical connecting device 20 is connected to the RFID power socket 10, and as a result, the electrical connecting device for charging the electric vehicle is identified, thereby verifying an attempt to charge the electric vehicle.

In this case, the RFID card 21a embedded in the electrical connecting device 20 for slow charging is an ID card (identification card) for verifying an operation of charging the electric vehicle. The RFID card 21a allows the operation of charging the electric vehicle to be verified, and distinguishes the electrical connecting device 20 from similar devices of other users in the server 30 of the charging service provider.

To this end, different IDs for verifying charging operations are assigned to respective RFID cards 21a which are embedded in the electrical connecting device 20 for slow charging of different users, thereby distinguishing different users.

Here, the RFID card 21a refers to a device that stores information on an ultra-small chip and has an antenna to transmit data within a short range in a wireless manner.

The charging connector unit 21 serves to supply the battery of the vehicle with electricity, which is supplied through the socket connecting unit 22, so as to charge the battery when the charging connector unit 21 is electrically connected to the vehicle.

Further, the socket connecting unit 22 is an electrical connecting mechanism such as a general plug or a code set which is electrically connected to the RFID power socket 10 and supplied with electricity supplied through the RFID power socket 10, and the socket connecting unit 22 is connected to the control unit 23.

The control unit 23 includes an electric meter 23c, a first data communication unit 23b, and a second data communication unit 23a.

The electric meter 23c has a predetermined rating specification and measures electric energy, which has been used to charge the electric vehicle, by measuring an amount of electricity that is supplied to the electric vehicle through the socket connecting unit 22 via the charging connector unit 21. The electric meter 23c measures total accumulated electric energy that has been used for a certain period of time (for example, for one month).

In particular, when the RFID recognition device of the power socket 10 verifies an attempt to charge the vehicle, the electric meter 23c thereafter measures accumulated electric energy that has been used to charge the vehicle for a predetermined period of time.

The first data communication unit 23b is a data communication device (or a modulation and demodulation device) such as a power line communication (PLC) modem, and collects vehicle information (a vehicle state, a vehicle position, and a battery state) while being operated in conjunction with a data communication unit (PLC modem) for a vehicle mounted in the electric vehicle. In this case, the collected information is transmitted to the server 30 for a charging service provider through the second data communication unit 23a.

The second data communication unit 23a is a data communication device (or a modulation and demodulation device) such as a code division multiple access (CDMA) modem, and transmits information about electric energy (a charge amount) and vehicle information (a vehicle state, a vehicle position, a battery state, etc.), which are collected by the electric meter 23c and the first data communication unit 23b, to the server 30 for a charging service provider.

Information about a charged state of the vehicle (for example, information about a position of the power socket such as information about a vehicle position or information about a position where the vehicle is charged, information about a charge amount such as information about electric energy, and the like), which is transmitted to the server 30 for a charging service provider, is gathered by the charging service provider, and the charging service provider transmits the gathered information about a charged state of the vehicle to the electric power company or an electricity rate collector through the server. In this case, the position of the RFID power socket 10 may be recognized using information about a vehicle position of the electric vehicle that is charged with electricity supplied through the RFID power socket 10.

The vehicle information (a vehicle state, a battery state, etc.), which is collected by the first data communication unit 23b, is utilized again by the charging service provider, and used to build a business model in the future.

Based on the information about the position of the power socket 10 and the information about the charge amount, which are received from the server 30 for a charging service provider, the electric power company 40 charges for electricity (power rate) according to an electricity rate dedicated for the electric vehicle, thereby preventing imposition of progressive taxes that may be incurred because it is impossible to communicate with the server 30 for a charging service provider when the existing general ICCB is used.

In addition, in a case in which the aforementioned system for charging the electric vehicle is applied, loads of the RFID power socket 10 may be managed by the electric power company 40, and an operation of charging the electric vehicle may be turned on/off.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A system for charging an electric vehicle, comprising:
a portable electrical connecting device which supplies a vehicle with electricity, which is supplied through an RFID power socket when the electrical connecting device is connected to the RFID power socket, so as to charge the vehicle,
wherein the portable electrical connecting device includes:
a charging connector unit which is connected with the vehicle;
a socket connecting unit which is electrically connected with the RFID power socket, and supplied with electricity supplied through the RFID power socket; and
a control unit which collects information about electric energy used to charge the vehicle and information about a position where the vehicle is charged, and transmits the information to a server for a charging service provider in order to charge for electricity according to an electricity rate dedicated to the vehicle; and wherein the control unit includes:
an electric meter which measures accumulated electric energy used to charge the vehicle for a certain period of time;
a first data communication unit which collects predetermined vehicle information including a vehicle position while being operated in conjunction with a data communication unit for a vehicle which is mounted in the vehicle; and
a second data communication unit which transmits the vehicle information collected by the first data communication unit and the information about the electric energy measured by the electric meter to the server for a charging service provider.

2. The system of claim 1, comprising:
an electric power company which charges for electricity used to charge the vehicle, based on the information about the position where the vehicle is charged and the information about the electric energy which are transmitted from the electrical connecting device for slow charging.

3. The system of claim 1, wherein using a server of a charging service provider, the electrical connecting device transmits the information about the position where the vehicle is charged and the information about the electric energy to the electric power company which charges for electricity used to charge the vehicle.

4. The system of claim 1, wherein an RFID card, which is used to verify an operation of charging the vehicle when the electrical connecting device is connected to the RFID power socket, is installed in the electrical connecting device, and an RFID recognition device, which is used to distinguish whether or not connection is made to charge the vehicle by reading the RFID card when the electrical connecting device is connected to the RFID power socket, is installed in the RFID power socket.

5. A system for charging an electric vehicle, comprising:
a portable electrical connecting device which supplies a vehicle with electricity, which is supplied through an RFID power socket when the portable electrical connecting device is connected to the RFID power socket, so as to charge the vehicle, the electrical connecting device configured to collect information about electric energy used to charge the vehicle and information about a position where the vehicle is charged, in order to charge for electricity according to an electricity rate dedicated for the vehicle,
wherein the portable electrical connecting device includes:
a charging connector unit which is connected with the vehicle;
a socket connecting unit which is electrically connected with the RFID power socket, and supplied with electricity supplied through the RFID power socket; and
a control unit which collects information about electric energy used to charge the vehicle and information about a position where the vehicle is charged, and transmits the information to a server for a charging service provider in order to charge for electricity according to an electricity rate dedicated to the vehicle; and
wherein the control unit includes:
an electric meter which measures accumulated electric energy used to charge the vehicle for a certain period of time;
a first data communication unit which collects predetermined vehicle information including a vehicle position while being operated in conjunction with a data communication unit for a vehicle which is mounted in the vehicle; and
a second data communication unit which transmits the vehicle information collected by the first data communication unit and the information about the electric energy measured by the electric meter to the server for a charging service provider.

6. The system of claim 5, further comprising an electric power company which charges for electricity used to charge the vehicle, based on the information about the position where the vehicle is charged and the information about the electric energy which are transmitted from the electrical connecting device.

7. The system of claim 5, wherein the portable electrical connecting device includes:
a charging connector unit which is connected with the vehicle;
a socket connecting unit which is electrically connected with the RFID power socket, and supplied with electricity supplied through the RFID power socket; and
a control unit which collects the information about the electric energy used to charge the vehicle and the information about the position where the vehicle is charged, and transmits the information to a server for a charging service provider.

8. A system for charging an electric vehicle, comprising:
a portable electrical connecting device which supplies a vehicle with electricity, which is supplied through an RFID power socket when the electrical connecting device is connected to the RFID power socket, so as to charge the vehicle,
wherein the portable electrical connecting device includes:
a charging connector unit which is connected with the vehicle;
a socket connecting unit which is electrically connected with the RFID power socket, and supplied with electricity supplied through the RFID power socket; and
a control unit which collects information about electric energy used to charge the vehicle and information about a position where the vehicle is charged, and transmits the information to a server for a charging service provider in order to charge for electricity according to an electricity rate dedicated to the vehicle; and
wherein the control unit includes:
an electric meter which measures accumulated electric energy used to charge the vehicle for a certain period of time;
a first data communication unit which collects predetermined vehicle information including a vehicle position while being operated in conjunction with a data communication unit for a vehicle which is mounted in the vehicle; and
a second data communication unit which transmits the vehicle information collected by the first data communication unit and the information about the electric energy measured by the electric meter to the server for a charging service provider,
wherein the portable electrical connecting device is formed with an in-cable control box, the first data communication unit is formed with a power line communication (PLC) modem, and the second data communication unit is formed with a code division multiplex access (CDMA) modem.

9. The system of claim 1, wherein the RFID power socket is formed by installing an RFID recognition device to a general power socket that is installed in an existing house or building, and distinguishes, using the RFID recognition device, whether an object connected to the RFID power socket is an electric vehicle or general electric device.

\* \* \* \* \*